3,170,839
CULTURE PROCESS IN VITRO PLACENTAL TISSUE GROWTH MEDIUM

Lewis C. On, Berkeley, Calif., assignor to Borden Laboratories, a corporation of California
No Drawing. Filed Feb. 14, 1962, Ser. No. 173,114
1 Claim. (Cl. 167—78)

This invention relates to the culturing of human placentas to obtain placental extracts and also relates to a process for the production of chorionic gonadotropin from placenta media. Chorionic gonadotropin is a well-recognized gonad stimulating substance which is interally secreted by the chorion during pregnancy. Heretofore chorionic gonadotropin has been produced by the extraction of the hormone from placenta tissue or from urine. Obviously, these sources of raw material are limited and such material is difficult to collect.

In accordance with the present invention, chorionic gonadotropin is produced by a biological process in an efficient manner. The human placenta is used as the basic material, but the placenta is kept growing continuously so protracted production is obtainable from an initial charge of the placenta material. In general, the invention is carried out by dissecting out the cytotrophoblast tissue from a fresh placenta, growing this portion of the placenta material in a nutrient medium and periodically removing a portion of the fluid medium and extracting the chorionic gonadotropin from the medium. Of course, the medium which is withdrawn is substituted by fresh medium to replace the medium withdrawn. The chorionic gonadotropin is then extracted from the withdrawn medium and purified as is hereinafter described in detail.

The following non-limiting example illustrates a preferred method of culturing the material in accordance with the present invention.

EXAMPLE I

Human placentas are obtained from hospitals under sterile conditions from foetuses from two months old to maturity and are preserved carefully in normal saline solutions and kept as near as possible at 37° C. As soon as possible, after separation from the mother host, the placenta is dissected and the cytotrophoblast tissue removed therefrom. The chorion may also be removed at this time and separately processed. The cytotrophoblast tissue is then carefully washed in normal saline solution to extract extraneous blood and other materials. The cytotrophoblastic cells or tissue are then either cut into strips or placed whole in a culture-carrying rack suitably of glass or stainless steel. In order to provide for free circulation of culture medium around the tissue, the tissue may be suspended by suturing the material onto the rack or it can be imbedded in glass wool or other cellular material. The rack or carrier is then placed in a suitable culture chamber, preferably of glass, which chamber is designed to ensure maximum circulation of the culture medium and to permit free activity and cellular activity of the metabolic processes. The chamber has a partitioned bottom portion which is kept free of tissue and a magnetic stirrer is provided in the bottom of the chamber to ensure a constant stirring motion throughout the chamber. The chamber and medium are kept as near as 37° C. as possible by a constant temperature device. The following medium is employed:

| | | |
|---|---|---|
| a. Yeast extract | gm | 0.5 |
| b. Eagles L. Media (Difco) | gm | 7.6 |
| c. Bacto peptone | gm | 15.0 |
| d. Lacto albumin hydrolysate | gm | 2.5 |
| e. Human placental extract | ml | 5.0 |
| f. Amniotic fluid | ml | 5.0 |
| g. Human cord serum | ml | 5.0 |
| h. Human blood plasma | ml | 50.0 |
| i. Sodium bicarbonate, 10% | ml | 10.0 |
| j. Glutamine | ml | 3.0 |
| k. Thymidine | gm | 1.0 |
| l. Vitamine E | gm | 0.5 |
| m. Penicillin | gm | 0.5 |
| n. Dihydrostrephtomycin | gm | 0.5 |
| o. Distilled water q.s., 1 liter. | | |

One liter of the above medium is suitable for use with about 500 gm. of the tissue although more or less can be employed. The pH is adjusted to 7 to 8. A portion of the culture medium can be drawn off and replaced with fresh medium periodically. Ordinarily, the culture medium is withdrawn about every six days for harvest although periods of time as short as 24 hours or as long as ten days to two weeks can be employed, depending upon the rapidity of the proliferation of cells and yield of products desired.

Various extraction methods can be used for the isolation of human gonadotropin from the withdrawn culture medium as the following examples show:

EXAMPLE II

*The kaolin method of extraction of gonadotropin from tissue culture medium* a. Chill one liter of culture medium and adjust pH to 3.5.

b. Add 20 gm. of kaolin (Mallinckrodt NF VIII colloidal) and stir briskly for at least 5 minutes.

c. Filter through 50 Whatman paper with a pad of 1 Whatman underneath or similar porous base material.

d. Wash precipitate with 2 liters of distilled water containing 1 ml. of glacial acetic acid.

e. Elute gonadotropin with 100 ml. of 2 N $NH_4OH$ and run the 100 ml. through again and then wash filter bed with 50 ml. of water. Add wash water to $NH_4OH$ eluate.

f. Adjust eluate to pH 5.0 with glacial acetic acid about 4–9 ml.

g. Add 2 volumes acetone and let stand for at least ½ hour.

h. Centrifuge, discard supernatant liquor and emulsify precipitate in approximately 16 ml. distilled water.

i. Dialyze at 2 to 5 deg. centigrade.

The material can then be lyophilized to produce a powder or it can be processed as a solution as by adding sodium phosphate, lactose and a preservative.

EXAMPLE III

*Method using benzoic acid-acetone* a. Chill 1 liter of culture medium, with or without prefiltering and adjust pH to 3.5–4 using lacial acetic acid or benzoic acid.

b. Add and stir in 50 ml. of saturated benzoic acid-acetone solution; let stand overnight at 2–5° C.

c. Centrifuge or decant, retaining precipitate.

d. Add 45 ml. saturated benzoic acid-actone solution to supernatant liquid from step C, and combine precipitate with No. 1 fraction.

e. Dissolve precipitate into 60 ml. of 100% acetone.

f. Centrifuge or decant.

g. Dialyze at 2–5° C.

h. Lyophilize or process in solution as in Example II. The material can be further purified by following the steps of Example II.

EXAMPLE IV

*Method using ammonium sulfate* a. Use 1 liter of culture medium as harvested, chilled and adjust pH to 3.5 with a few drops of 1:1 $H_2SO_4$.

b. Let set or stand overnight at 2–5° C. and filter through Whatman 50 paper.

c. Discard the precipitate and add 282 gm. of solid (0.4 saturation) ammonium sulfate. Gently stir until dissolved and let stand overnight at 2–5° C.

d. Filter off precipitate in a soft fluted filter paper using a small amount of filter aid, performed at 2–5° C.

e. The precipitate is discarded.

f. Bring the filtrate to 0.7 saturation by adding 212 gm. solid ammonium sulfate. Gently stir until dissolved, then adjust pH 3.2–3.3 with 1:1 $H_2SO_4$.

g. Let stand for 48 hours at 2–5° C.

h. Filter off precipitate in Buchner funnel on 50 Whatman paper and discard filtrate.

i. Weigh precipitate (without drying) and dissolve in an equal weight of water and adjust pH to 8–9.

j. Add enough saturated ammonium sulfate solution and bring to 0.7 saturation.

k. Adjust pH to 3.2–3.3 and let set overnight at 2–5° C.

l. Filter on 50 Whatman paper, weigh precipitate and dissolve in ¾ volume of water, i.e. ¾ the weight of precipitate.

m. Dialyze at 2–5° C.

n. Process further as in Example III.

Variations can be made in the above-described process without departing from the spirit of this invention. For instance, the exact culture medium may be varied by changing the quantities of the various materials somewhat. Further, other antibiotics may be used in addition to those specified. It is frequently desirable to provide some continuous method for purifying the medium by taking out the waste products of the metabolic processes such as by the use of an artificial kidney. Instead of the magnetic stirring specified, a portion of the medium can be withdrawn, passed through a pump and circulated back into the culture chamber.

Although the cytotrophoblast cells are the preferred material from the placenta, the chorion and the amnion can also be dissected from the placenta and used as described above.

Although the method is primarily directed to the production of human chorionic gonadotropin, the medium from the culture described contains other valuable products such as biocatalysers, alkaline and acid phosphatase, vitamins, amino acids, trace elements and the like which form valuable materials for animal experiments and investigational purposes.

I claim:

The method of growing human placental tissue for the purpose of elaborating chorionic gonadotropin comprising attaching the cytotrophoblastic, amnionic and chorionic portions thereof to a fixed support member and circulating a nutrient medium around said stationary tissue portions, said medium comprising:

| | | | |
|---|---|---|---|
| (a) | Yeast extract | gm | 0.5 |
| (b) | Eagles L. Media | gm | 7.6 |
| (c) | Bacto peptone | gm | 15.0 |
| (d) | Lacto albumin hydrolysate | gm | 2.5 |
| (e) | Human placental extract | ml | 5.0 |
| (f) | Amniotic fluid | ml | 5.0 |
| (g) | Human cord serum | ml | 5.0 |
| (h) | Human blood plasma | ml | 50.0 |
| (i) | Sodium bicarbonate, 10% | ml | 10.0 |
| (j) | Glutamine | ml | 3.0 |
| (k) | Thymidine | mgm | 1.0 |
| (l) | Vitamin E | gm | 0.5 |
| (m) | Penicillin | gm | 0.5 |
| (n) | Dihydrostreptomycin | gm | 0.5 |
| (o) | Distilled water q.s., 1 liter | | | while maintaining the circulating medium at a pH in the range 7 to 8 and at a temperature of about 37° C. and periodically withdrawing a portion of said medium and extracting chorionic gonadotropin therefrom.

References Cited by the Examiner

Bradbury et al.: Proc. Soc. Exptl. Biol. and Med., vol. 71, June 1949, pages 228–232

Thiede et al.: Procs. Soc. Exptl. Biol. and Med. 107: 3, 1961, pp. 565–9.

Sato et al.: Science 126: 3280, Nov. 8, 1957, pp. 961–4.

Yeast: JAMA 160: 17, page 128, Apr. 28, 1956.

Eagle: Science 122: 3168, Sept. 16, 1955, pp. 501–4.

Stewart et al.: Jour. Clin. Endo., vol. 8, February 1948, pp. 175–188.

Jones et al.: Johns Hopkins Bulletin, vol. 72, 1943, pp. 26–38.

JULIAN S. LEVITT, *Primary Examiner.*

M. O. WOLK, LEWIS GOTTS, *Examiners.*